March 31. 1925.  R. M. WILLIAMSON  1,532,011

ARITHMETIC TEACHING DEVICE

Filed March 21, 1924

Inventor
Robert Marshall Williamson
By Dowell and Dowell
his Attorneys

Patented Mar. 31, 1925.

1,532,011

UNITED STATES PATENT OFFICE.

ROBERT MARSHALL WILLIAMSON, OF BURLEY, NEAR BROCKENHURST, ENGLAND.

ARITHMETIC-TEACHING DEVICE.

Application filed March 21, 1924. Serial No. 700,839.

*To all whom it may concern:*

Be it known that I, ROBERT MARSHALL WILLIAMSON, a subject of the King of Great Britain and Ireland, residing at Burley, near Brockenhurst, in the county of Southampton, England, have invented an Improved Arithmetic-Teaching Device, of which the following is a specification.

This invention relates to devices of the kind in which tablets or the like are movable along guides and it has for its object to provide an improved apparatus adapted to teach visually the decimal system of ciphering whether of whole numbers or of fractions. To this end the apparatus is characterized by a base which is stepped upwardly in a direction from right to left, with each of which steps is associated a guide and plurality of distinctive indicating tablets movable therealong, the whole being such that a series of columns of tablets are presented to a learner in the same way as columns of figures appear. The advantage of such an apparatus resides in the facility with which one can impress upon the learner the importance of position as affecting values so that the common mistake of failing to keep figures in appropriate columns is avoided. The gradation of the base in steps may be emphasized by a color gradation in addition.

A further feature of the invention consists in the employment of frames each adapted to slide in relation to the column of tablets and capable of temporarily embracing a limited number thereof, not however exceeding nine, which is the largest single number, so that it is necessary in demonstrating addition, for example, to show that after nine tablets have been established in one frame the adding of another involves the inclusion of a single tablet in the frame of a column next higher in order, or in other words the exchange of a tablet marked 10, for 10 tablets marked 1 and so on, it being understood that the tablets in each individual column are marked alike.

Figure 1:
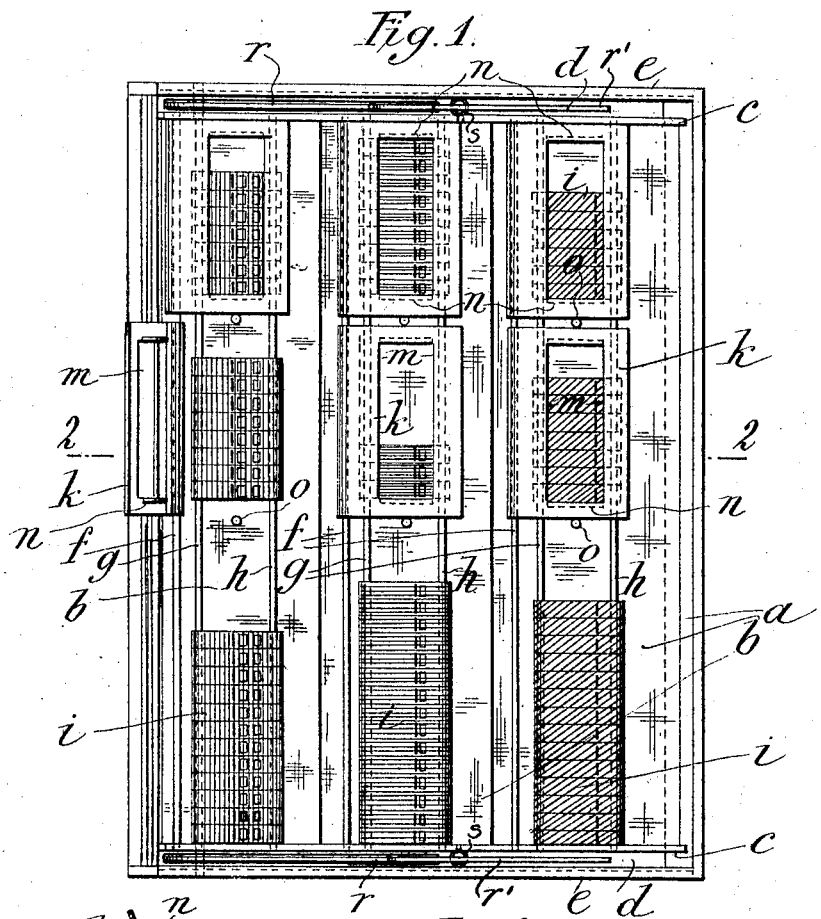
Figure 2:
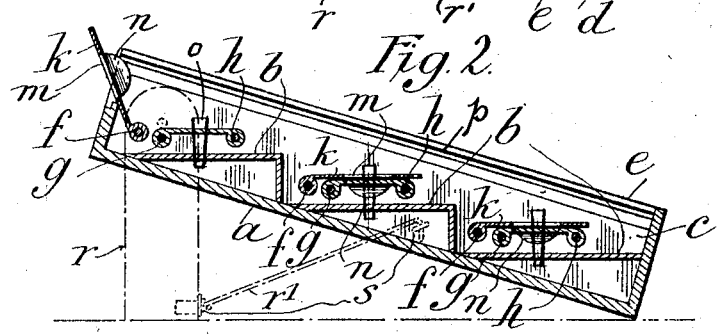
Figures 3, 4:
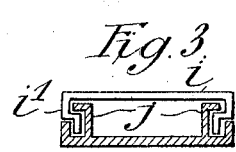

These and other features will appear from the constructional example now about to be described with the aid of the accompanying drawings, whereof Fig. 1 is a plan and Fig. 2 a transverse section on the line 2—2 Fig. 1. Figs. 3 and 4 are sectional views illustrating two detail modifications.

As shown in Figs. 1 and 2 the base of the device consists of a rectangular box-like board $a$ the upper surface of which is graded in level as a regular series of steps $b$, of any number, but preferably not less than three.

For convenience in storing the board, which may be advantageously though not necessarily made in one piece, the aforesaid steps $b$ are made so that the "tread" or surface of each is brought into a horizontal plane when the left side of the board is raised sufficiently; and the board is to be used when secured as a whole in that inclined plane, the highest step being at the left-hand side, and the lowest step at the right-hand side, of the board.

The upper surface of the board is also preferably colored in a gradation of tints or depth of one color, it may be grey, the depth of color increasing with the fall in level of the steps, but each step, save as hereinafter provided, being colored uniformly.

The steps are conveniently though not necessarily made singly of ply-wood or other suitable material, and may extend between two members $c$ separated by a slight space $d$ from the ends $e$.

Three wires $f$, $g$ and $h$ or parts of a single wire laced to and fro between the members $c$ which thus act as straining-plates, run along and above each step, the wires, $f$ and $g$ being to the left and the wire $h$ to the right, of the central line of the step. The left-hand wire, $f$ may be placed at a slightly greater height above the step than the wires $g$ and $h$.

Each step is provided with numerous, preferably not less than twenty-seven, flat narrow tablets $i$ of aluminium or other material and of uniform shape and size, the length of each, it may be, about one half of the width of the step. The ends of the said tablets are formed as rings or otherwise adapted for easy passage along the wires $g$ and $h$ preferably without touching the steps.

Alternatively the wires $g$ and $h$ may be replaced by rails, such as by a member constituting rails $j$ as shown diagrammatically in section in Fig. 3 or rails $j^1$ as in Fig. 4, the said members resting on the steps, and the ends of each of the aforesaid tablets being formed correspondingly to fit loosely within the said rails, as shown sectionally at $i^1$ and $i^2$ in Figs. 3 and 4.

All the tablets $i$ are preferably colored on their upper surfaces, all on each step being colored uniformly, but the tablets on no two steps being colored alike, this feature, like the gradation of level and possible gradations of coloration of the surface of the board, being designed to emphasize the positional values of the said tablets. Each tablet also preferably bears a number, in white or other distinctive color, on its colored surface, the tablets on each step being numbered alike and the number on each tablet on any one step being one tenth of the number on each tablet on the next step, if any, to the left, and ten times the number on each tablet on the next step, if any, to the right of the same, according to the decimal system of ciphering. If the board be not designed to afford object lessons in decimal fractions each tablet on the lowest or extreme right-hand step would be numbered 1, and each tablet on successvie steps to the left thereof 10, 100_____ serially as shown in Fig. 1. If the board be designed to afford object lessons in decimal fractions as well as whole numbers the tablets preferably on the central step, or on the step immediately to the left of the central line of the board, would each be numbered 1, and the tablets on steps to left and right of the said step would each be numbered 10, 100_____ and .1, .01_____ respectively and serially. In this latter case the step bearing tablets numbered 1 is made wider than the normal step, a strip along the right-hand side of its surface, corresponding to its extra width, is distinctively and conspicuously colored, it may be in white, and marks are formed thereon prominently, it may be in black, at moderate intervals, along the entire length of the said strip to represent decimal points.

Each step is further provided with not less than two small open rectangular frames $k$, of aluminum or other material, all of uniform shape and size, the left-hand edge of each frame being formed to allow of its easy passage along the wire, supported partly by such wire and partly by the operator's hand or by the wire $h$ at its right hand side. The frame $k$ is adapted to be revolved about the left-hand wire $f$.

In each frame a rectangular opening $m$ is cut adapted to expose the colored and numbered surfaces of nine tablets and short flanges $n$ are provided at the ends of the opening adapted to enclose between them nine tablets, but not more than nine, and to prevent the independent passage of the tablets along the wires when the frame encloses them. Each frame when not being supported independently by the operator may rest either horizontally on the wires $g$ and $h$, or in a plane suitably inclined to the vertical, supported by wire $f$ and by the edge either of the next step $b$ to the left or of the side of the box board as the case may be.

Small holes are made in each step $b$, between wires $g$ and $h$, at intervals slightly greater than the length of the frames $k$, and small pegs $o$ of wood or other material are provided adapted to be inserted therein and obstruct passage of the said frames or tablets along the steps. If the board be made in one piece a light top may be provided to slide in a groove $p$ in opposite sides.

Two legs $r$ are provided each movable hingewise and adapted at one time to support the board in inclined position when in use and at another time to be housed in the space $d$ in the board, for example. When the board is in use each leg is secured in vertical position as by a wire strut $r$, engaging rings $s$, fixed in the leg and in the end of the board.

What I claim is:—

1. In a device of the kind described, a base the surface of which is provided with a range of steps, a plurality of indicating tablets associated with each step, guide means whereby the tablets associated with any one step can be slid columnwise in relation to each step, and means whereby movement of tablets separated from others in a column can be obstructed.

2. In a device of the kind described, a base, a plurality of indicating tablets, guide means whereby the tablets can be slidably supported in columns, and slidable means adapted to be temporarily engaged with and thus select, isolate and collectively move certain of the tablets in a column.

3. In a device of the kind described, a base, a plurality of indicating tablets, guide means whereby the tablets can be slidably supported in columns, slidable means adapted to be temporarily engaged with and thus select, isolate and collectively move certain of the tablets in a column, and means for obstructing movement of the last mentioned means when so desired.

4. In a device of the kind described, a base the surface of which is provided with a range of steps, a plurality of indicating tablets associated with each step, guide means whereby the tablets associated with any one step can be slid columnwise in relation to such step, and slidable means adapted to be temporarily engaged with and thus select, isolate and collectively move certain of the tablets in a column.

5. In a device of the kind described, a base, the surface of which is provided with a range of steps, a plurality of indicating tablets associated with each step, guide means whereby the tablets associated with any one step can be slid columnwise in relation to such step, slidable means adapted to be temporarily engaged with and thus select, isolate and collectively move certain of the tablets in a column, and means for obstructing movement of the last mentioned means when so desired.

6. In a device of the kind described, a base provided with a range of steps, three sets of guides associated with each step, tablets adapted to slide along two of the guides and a frame adapted to slide or to be angularly turned about the third guide, substantially as described.

Signed at Southampton, England, this twenty-eighth day of February, 1924.

ROBERT MARSHALL WILLIAMSON.